(12) United States Patent
Liu et al.

(10) Patent No.: US 10,569,335 B2
(45) Date of Patent: Feb. 25, 2020

(54) WHEEL MACHINING TOOL

(71) Applicant: CITIC Dicastal CO., LTD, Qinhuangdao (CN)

(72) Inventors: Minghua Liu, Qinhuangdao (CN); Yingjun Zhou, Qinhuangdao (CN); Weidong Liu, Qinhuangdao (CN); Xiao Liu, Qinhuangdao (CN); Xiaoguang Huang, Qinhuangdao (CN); Jiandong Guo, Qinhuangdao (CN); Huiying Liu, Qinhuangdao (CN); Yuexin Lu, Qinhuangdao (CN); Zhiyuan Yu, Qinhuangdao (CN); Ruixiao Zhou, Qinhuangdao (CN)

(73) Assignee: CITIC DICASTAL CO., LTD, Qinhuangdao Hebei (CN)

( * ) Notice: Subject to any disclaimer, the term of this patent is extended or adjusted under 35 U.S.C. 154(b) by 0 days.

(21) Appl. No.: 16/032,488

(22) Filed: Jul. 11, 2018

(65) Prior Publication Data
US 2019/0262905 A1 Aug. 29, 2019

(30) Foreign Application Priority Data

Feb. 24, 2018 (CN) .......................... 2018 1 01563149

(51) Int. Cl.
*B23B 27/00* (2006.01)
*B23B 5/02* (2006.01)
(Continued)

(52) U.S. Cl.
CPC .............. *B23B 5/02* (2013.01); *B23B 27/145* (2013.01); *B23B 29/24* (2013.01);
(Continued)

(58) Field of Classification Search
CPC .......... B23B 2220/445; B23B 2229/08; B23B 29/034; B23B 29/024; B23C 2210/287; B23C 2210/285
See application file for complete search history.

(56) References Cited

U.S. PATENT DOCUMENTS 1,460,029 A * 6/1923 Mattson ................ B23C 5/2269
407/113
2,630,725 A * 3/1953 Black ...................... B23B 29/03
407/48
(Continued)

FOREIGN PATENT DOCUMENTS

DE 3008008 A1 * 9/1981 ........... B23B 27/007
DE 102013014761 A1 * 3/2015 ............... B23C 5/06
(Continued)

OTHER PUBLICATIONS

JP-11262812-A Machine Translation, pp. 4-7 (Year: 2019).*
JP-08155723-A Machine Translation, pp. 6-11 (Year: 2019).*

*Primary Examiner* — Nicole N Ramos
(74) *Attorney, Agent, or Firm* — Calfee, Halter & Griswold LLP

(57) ABSTRACT

The invention discloses a wheel machining tool. A rough turning tool and a finish turning tool are respectively arranged on two sides of a tool head, the primary declination angle β of the rough turning tool is set to 90° to 120°, and the primary declination angle α of the finish turning tool is set to 85° to 95°; the axial height difference between the rough turning tool and the finish turning tool is set to 0.2-0.5 mm; the distance c between the rough turning tool and the tool head is set to 5-8 mm, and the distance b between the finish turning tool and the tool head is set to 3-5 mm. The rake angle δ of the rough turning tool is set to 12°-15°, the rake angle γ of the finish turning tool is set to 14°-17°.

1 Claim, 3 Drawing Sheets

(51) Int. Cl.
*B23B 27/14* (2006.01)
*B23B 29/24* (2006.01)

(52) U.S. Cl.
CPC ..... *B23B 2200/201* (2013.01); *B23B 2200/28* (2013.01); *B23B 2215/08* (2013.01); *B23B 2220/445* (2013.01); *B23B 2226/315* (2013.01)

(56) References Cited

U.S. PATENT DOCUMENTS

| | | | | |
|---|---|---|---|---|
| 3,759,625 | A * | 9/1973 | Iversen | B23C 5/241 408/188 |
| 4,105,360 | A * | 8/1978 | Keller | B23B 29/034 408/118 |
| 4,586,855 | A * | 5/1986 | Rawle | B23C 5/06 407/38 |
| 6,913,428 | B2 * | 7/2005 | Kress | B23D 77/02 408/144 |
| 2009/0257834 | A1 * | 10/2009 | Lysobey | B23B 29/03 407/36 |
| 2011/0222979 | A1 * | 9/2011 | Stadelmann | B23B 29/03407 408/147 |
| 2012/0230790 | A1 * | 9/2012 | Uno | B23B 5/109 408/227 |
| 2014/0161544 | A1 * | 6/2014 | Morandeau, Sr. | B23C 3/13 407/40 |

FOREIGN PATENT DOCUMENTS

| | | | | |
|---|---|---|---|---|
| EP | 2050529 | A2 * | 4/2009 | ........... B23B 27/007 |
| FR | 2924631 | A1 * | 6/2009 | ....... B23B 29/03417 |
| JP | 58217212 | A * | 12/1983 | ........... B23B 51/048 |
| JP | 02292108 | A * | 12/1990 | ............ B23C 5/1072 |
| JP | 08155723 | A * | 6/1996 | ............. B23C 5/109 |
| JP | 10277830 | A * | 10/1998 | ............. B23C 5/109 |
| JP | 11262812 | A * | 9/1999 | ............. B23C 5/109 |
| JP | 2001150219 | A * | 6/2001 | ........... B23B 51/048 |

* cited by examiner

WHEEL MACHINING TOOL

CROSS-REFERENCE TO RELATED APPLICATIONS

This application claims priority to Chinese Patent Application No. 201810156314.9 filed on Feb. 24, 2018, which is hereby incorporated by reference in its entirety.

TECHNICAL FIELD

The present application relates to a machining tool, specifically to an efficient tool for machining wheels.

BACKGROUND ART

During machining, in order to better remove the blank allowance and ensure the final dimensional accuracy of a product, rough turning and finish turning are established in the general machining process; the wheel is also machined by rough turning and finish turning, a blade having a large corner radius is adopted in rough turning to improve the rigidity and the stability of the tool, while a blade having a small corner radius is adopted in finish turning to ensure the surface quality and the dimensional accuracy; in the exiting wheel machining tools, the rough turning tool and the finish turning tool are respectively installed on a turret as two independent parts; after the rough turning, the turret will return to the origin to switch the tool, and then the finish turning is performed; and on the premise of unchanged machining parameters, how to ensure the machining quality and reduce the machining time becomes an urgent need.

SUMMARY OF THE INVENTION

The aim of the present application is to provide an efficient tool integrating rough turning and finish turning.

To achieve the above aim, the technical solution of the present application is: a wheel machining tool, including a tool shank, a tool head, a rough turning tool, a finish turning tool, a rough turning flute, a finish turning flute and fastening screws.

The rough turning blade of the rough turning tool is a hard alloy rhombic blade having a point radius of R3, and the finish turning blade of the rough turning tool is a polycrystalline diamond rhombic blade having a point radius of R0.8. The rough turning blade and the finish turning blade are symmetrically distributed along the axis of the tool shank, and the rough turning tool and the finish turning tool are respectively fixed on the tool head by the fastening screws. The primary declination angle of the rough turning tool is $\beta$ from 90° to 120°, and the primary declination angle of the finish turning tool is $\alpha$ from 85° to 95°.

In order to ensure that the rough turning tool and the finish turning tool do not interfere in machining the end face perpendicular to the axis of the tool shank, a height difference a of 0.2 mm to 0.5 mm is set between the rough turning tool and the finish turning tool in the direction parallel to the axis of the tool shank; and considering that the engagement of the cutting edge of the rough turning tool is greater than that of the finish turning tool, a distance c of 5 mm to 8 mm is set between the rough turning tool and the tool head, and a distance b of 3 mm to 5 mm is set between the finish turning tool and the tool head.

In order to ensure smooth chip discharge during machining, both the rough turning flute and the finish turning flute adopt a smooth transition surface from the plane of the tools to the tool head, and the transition arc is not less than 8 mm.

In order to ensure that the cutting edges of the finish turning tool and the rough turning tool are located on the same plane passing through the central axis of the tool shank, the rake angle of the rough turning tool is set to $\delta$ between 12° and 15°, and the rake angle of the finish turning tool is set to $\gamma$ between 14° and 17°. The cutting edges of the rough turning blade and the finish turning blade are distributed clockwise, thereby avoiding to-and-fro and positive-negative switchover of the main shaft during machining.

In the present application, the rough turning tool and the finish turning tool are fixed on the same tool head to realize a machining process including a rough turning step and a finish turning step on the same tool at the same time. Particularly when a hole is machined, due to the rotation characteristic of a hole machining part, two machining functions of left offset and right offset of the tool can be directly realized under the condition that the tool does not return to the origin, so that the time for changing the rough or finish turning tool is reduced, better matching of rough turning and finish turning quantities can be realized, the tool wear caused by mismatch of the machining quantities is reduced and the service life of the tool is prolonged. Because the rough turning function and the finish turning function are realized at one tool position on the turret, the rough turning tool and the finish turning tool can be regarded to use two tool compensations during actual machining, or the same tool can also be regarded to use one tool compensation, so that the diversity of tool compensation adjusted in real time increases. The present application not only can be applied in wheel machining, but also has a wide application prospect in machining of more rotating members, and at the same time, has the characteristics of simple manufacture and low cost.

Figure 1:
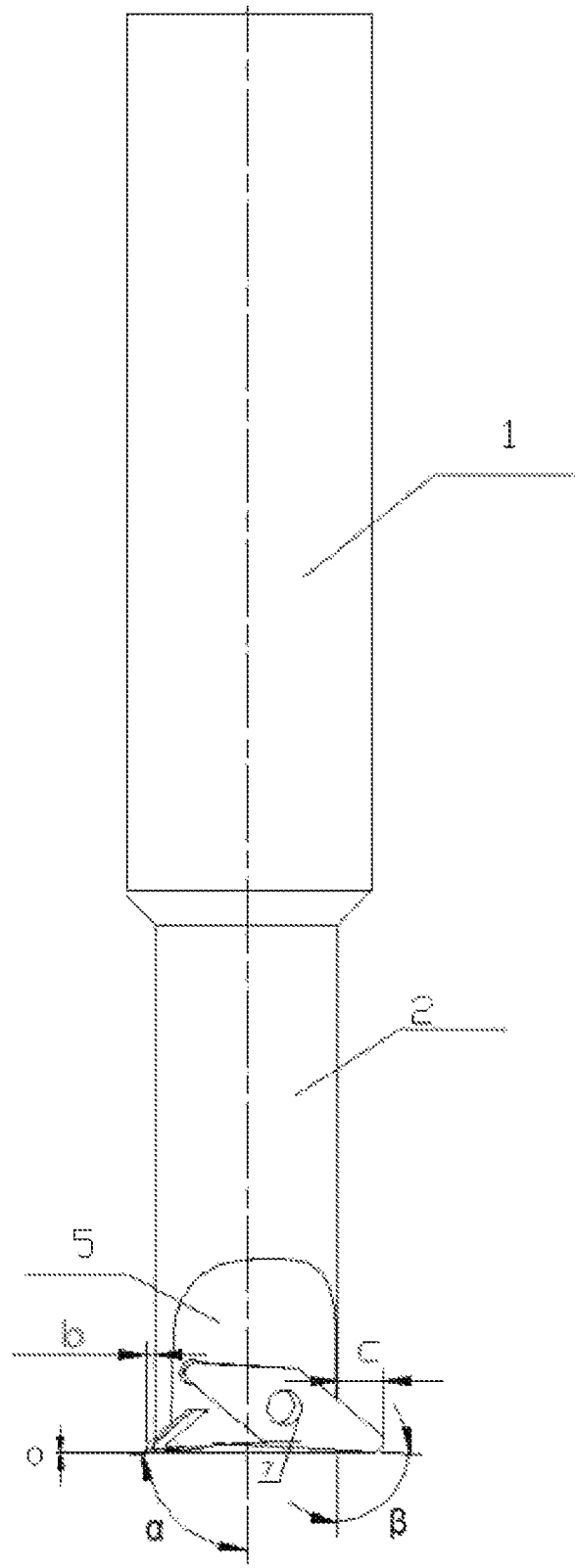
FIG. 1 is a front view of a wheel machining tool.
Figure 2:
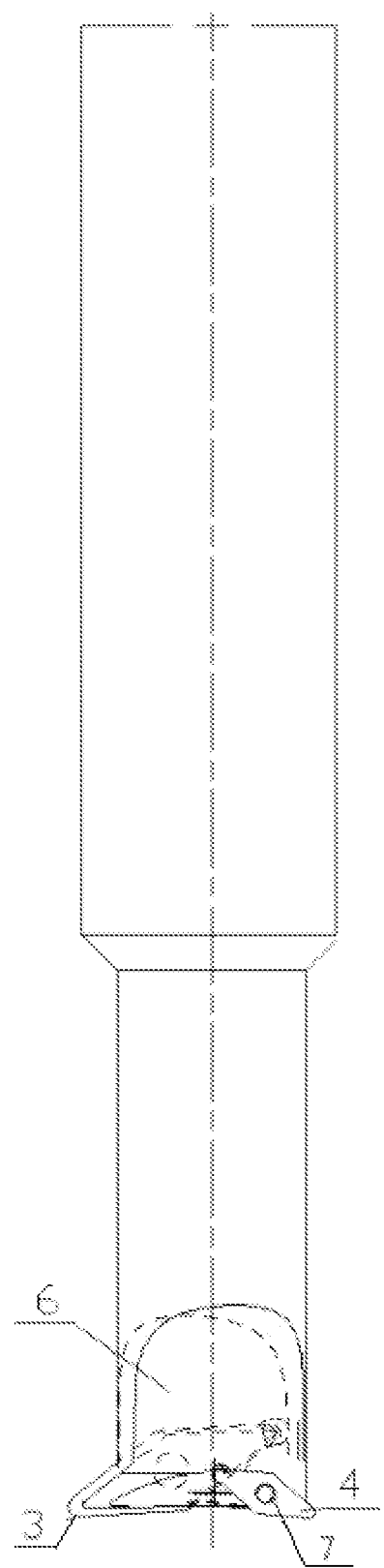
FIG. 2 is a right view of the wheel machining tool.
Figure 3:
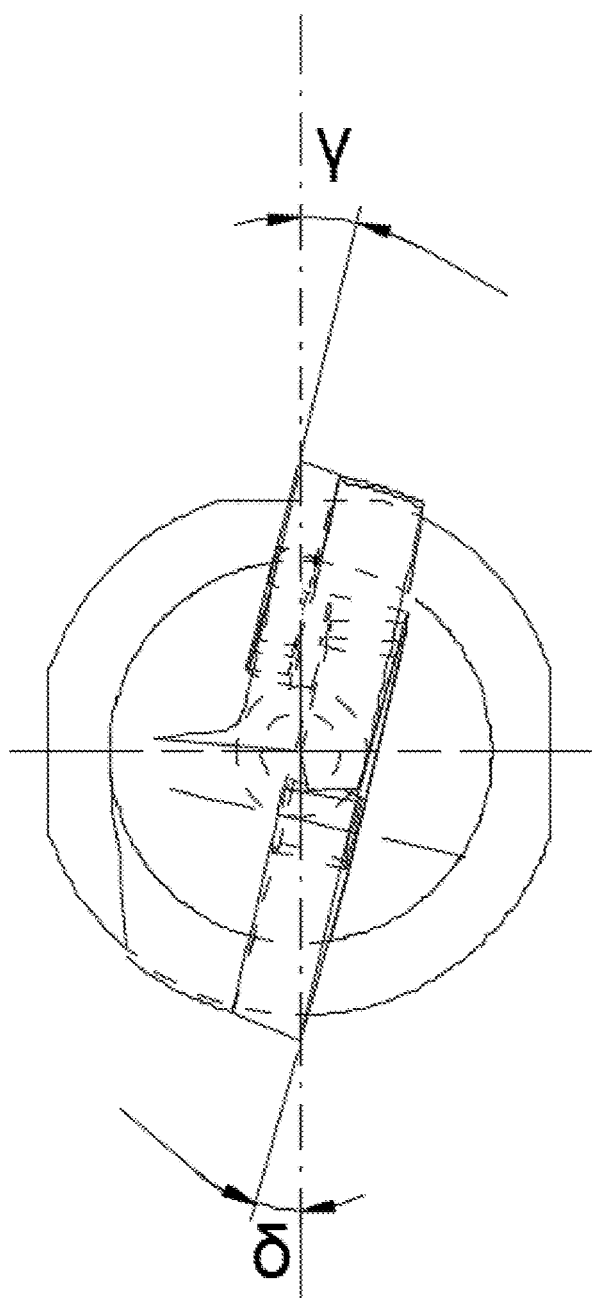
FIG. 3 is an upward view of the wheel machining tool, in FIG. 3, the dash dot line is where a plane of the rough turning tool or a plane of the finish turning tool is located.

In which, 1—tool shank, 2—tool head, 3—rough turning tool, 4—finish turning tool, 5—rough turning flute, 6—finish turning flute, 7—fastening screw.

DETAILED DESCRIPTION OF THE INVENTION

Specific details and working conditions of a device provided by the present application will be given below in combination with the accompanying drawings.

Embodiment 1: According to a wheel machining tool, a rough turning tool 3 and a finish turning tool 4 are arranged on two sides of a tool head 2 respectively and embedded into a tool groove in the tool head 2 through fastening screws 7. The primary declination angle $\beta$ of the rough turning tool 3 is 100°, and the primary declination angle $\alpha$ of the finish turning tool 4 is 90°. The height difference a between the rough turning tool 3 and the finish turning tool 4 in the direction parallel to the axis of a tool shank 1 is 0.4 mm, the distance c between the rough turning tool 3 and the tool head 2 is 6 mm, and the distance b between the finish turning tool 4 and the tool head 2 is 4 mm. The rake angle $\delta$ of the rough turning tool 3 is set to 13°, the rake angle $\gamma$ of the finish turning tool 4 is set to 15°, and the cutting edges of blades of the rough turning tool 3 and the finish turning tool 4 are distributed clockwise.

According to the present application, the machining tracks originally completed using a rough turning tool and a finish turning tool are integrated on one tool, and the tool can simultaneously complete rough turning and finish turning by reasonably distributing the angles and the relative position relation of the rough turning tool 3 and the finish turning tool 4 for the actual machined blank, thereby saving the time when the turret returns to the origin, reducing the tool change time, saving the quick positioning time for one tool at the same time and achieving higher machining efficiency.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A wheel machining tool, comprising a tool shank, a tool head, a rough turning flute, a finish turning flute and fastening screws, wherein a rough turning tool and a finish turning tool are respectively arranged on two sides of the tool head, a primary declination angle $\beta$ of the rough turning tool is set to 90° to 120°, and a primary declination angle $\alpha$ of the finish turning tool is set to 85° to 95°; a axial height difference between the rough turning tool and the finish turning tool is set to 0.2 mm to 0.5 mm; a distance c between the rough turning tool and the tool head is set to 5 mm to 8 mm, and a distance b between the finish turning tool and the tool head is set to 3 mm to 5 mm; the rough turning flute adopts a smooth transition surface from a plane of the rough turning tool to the tool head, and the finish turning flute also adopts a smooth transition surface from a plane of the finish turning tool to the tool head, each transition arc of the smooth transition surface is not less than 8 mm, a rake angle $\delta$ of the rough turning tool is set to 12° to 15°, a rake angle $\gamma$ of the finish turning tool is set to 14° to 17°, and a cutting edge of a rough turning blade of the rough turning tool and a cutting edge of a finish turning blade of the finish turning tool are distributed clockwise.

\* \* \* \* \*